United States Patent [19]
Bohl et al.

[11] 3,867,515
[45] Feb. 18, 1975

[54] TREATMENT OF TITANIUM TETRACHLORIDE DRYER RESIDUE

[75] Inventors: Lester E. Bohl, New Martinsville; Roy H. Rogerson, Moundsville, both of W. Va.; Frederick G. Stroke, McMurray, Pa.

[73] Assignee: PPG Industries, Inc., Pittsburgh, Pa.

[22] Filed: Apr. 1, 1971

[21] Appl. No.: 130,330

[52] U.S. Cl.............. 423/593, 423/76, 423/592, 423/593, 423/613, 264/109, 23/313
[51] Int. Cl... C01g 31/00, C01g 23/04, C02g 27/22
[58] Field of Search .......... 423/592, 593, 594, 659, 423/613, 76; 75/.5 R; 23/312 R

[56] References Cited
UNITED STATES PATENTS

| | | |
|---|---|---|
| 3,361,525 | 1/1968 | De Rycke et al............. 423/613 X |
| 3,406,012 | 10/1968 | Rahn................................ 423/613 |
| 3,567,811 | 2/1971 | Humphrey ........................ 75/.5 R |
| 3,655,344 | 4/1972 | Mitchell et al................ 23/312 R X |
| 3,744,978 | 7/1973 | Pefferman.......................... 423/76 |

Primary Examiner—Edward Stern
Attorney, Agent, or Firm—Irwin M. Stein

[57] ABSTRACT

The production of titanium tetrachloride by chlorination of titaniferous ore is described. Titanium tetrachloride dryer residue obtained by drying titanium tetrachloride purification sludge is pelletized into agglomerates, and the agglomerates optionally calcined in an oxidizing atmosphere at temperatures sufficient to convert substantially all of the metal chloride values in the residue to the respective metal oxides. Carbon is also removed from the pelletized residue during calcination.

15 Claims, 1 Drawing Figure

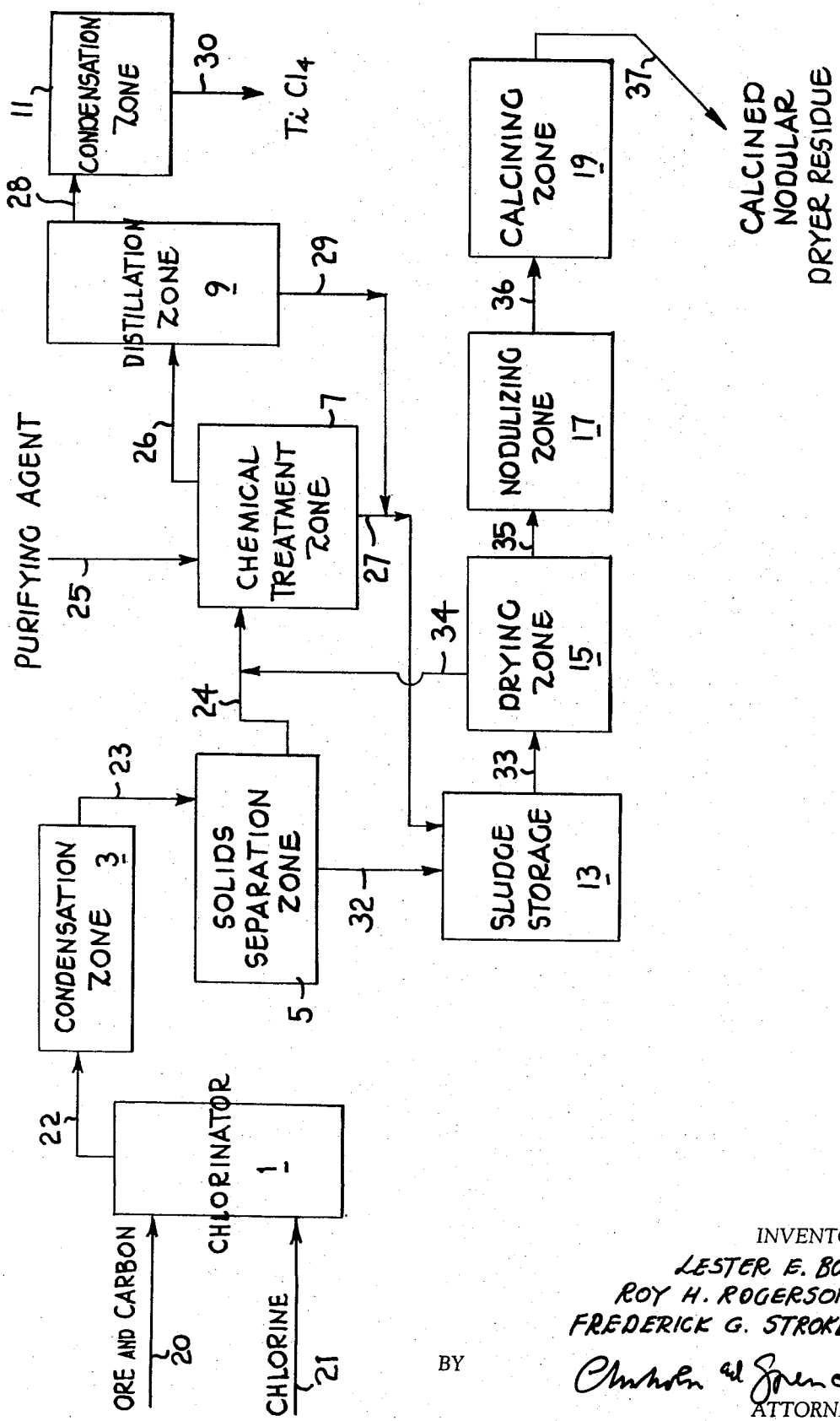

3,867,515

TREATMENT OF TITANIUM TETRACHLORIDE DRYER RESIDUE

BACKGROUND OF THE INVENTION

Titanium tetrachloride is produced commercially by reacting, at temperatures from about 500°C. to about 1,400° C., more usually from 800° C. to 1,100° C., a titanium-bearing material, such as ilmenite, rutile or titanium-containing slag, with chlorine and a reducing agent, such as carbon or other carbonaceous material, in a static bed or fluosolids reactor. The vaporous product effluent from the reactor comprises, in addition to titanium tetrachloride, carbon monoxide, carbon dioxide, chlorine, hydrogen chloride, and phosgene, as well as the chlorides and oxychlorides of the metallic and non-metallic (hereinafter referred to collectively as metal chlorides) values present in the ore and carbonaceous material. The aforesaid product effluent is normally cooled to below the dew point of titanium tetrachloride to produce an impure titanium tetrachloride condensate. This condensate can contain, in addition to liquid metal chlorides, solid metal chlorides (most notably iron chlorides), as well as unreacted solids carried over from the reactor with the vaporous product, such as titanium-bearing material, e.g., rutile ore, and carbonaceous material, e.g., coke. Before subjecting the impure titanium tetrachloride condensate to further purification, the solids contained in the condensate are normally separated therefrom. Solids separation can be conducted by one or more conventional vaporization and/or settling steps. Typically, such separated solids are retained as a 10 – 30 weight percent slurry in liquid metal chlorides, e.g., titanium tetrachloride, for subsequent processing. The resulting substantially solidsfree material is referred to as crude titanium tetrachloride.

The aforesaid solids can also be removed from the reactor product effluent before total condensation thereof by the use of, for example, cyclones - to remove entrained solids from the reactor, and selective partial condensation steps to remove selectively solid metal chlorides, e.g., iron chlorides, at above the dew point temperature of titanium tetrachloride.

Some of the liquid metallic chlorides and oxychlorides produced in the reactor (chlorinator), most notably the vanadium chlorides, have boiling points close to titanium tetrachloride and are not readily eliminated therefrom by fractional distillation. It has, therefore, become customary to treat substantially solids-free, crude titanium tetrachloride chemically prior to distillation to produce a titanium tetrachloride of higher purity. The liquid residue from the aforementioned chemical treatment is conventionally referred to as "purification sludge" because of its consistency and prior treatment. This sludge is combined with the solids and-/or solids slurry, e.g., the heel from the aforesaid vaporization and/or settling steps, obtained from the aforesaid solids separation treatment of impure titanium tetrachloride, and optionally with the bottoms product from various distillation and rectification zones in the titanium tetrachloride purification process, in a common receiver referred to herein collectively as "sludge storage." This sludge material contains a considerable amount of recoverable titanium tetrachloride and is, therefore, dried in suitable dryers. The titanium tetrachloride recovered from the dryers can be, and usually is, condensed for recycle back into the process at any convenient point, e.g., the chemical treatment zone or the reactor product effluent condensation zone.

The dry solids remaining in the dryers after substantially all of the titanium tetrachloride has been removed therefrom has been regarded, for the most part, as a waste product from the production of titanium tetrachloride. The dryer residue, therefore, is, after some preliminary treatment, typically dumped in a waste pond or waste slag area. Recently, it has been discovered that the vanadium and chromium chlorides and/or oxychlorides (collectively as chlorides) present in the dryer residue are leachable therefrom by water. Therefore, attention must be given to the disposal of dryer residue to insure that the potentially toxic metal values present therein remain in the waste disposal area.

It has now been discovered that titanium tetrachloride dryer residue can be treated to produce a product which is both amenable to shipment and treatment for recovery of the valuable metal values contained therein. In particular, it has been found that dryer residue can be easily pelletized (nodularized) by the addition of an aqueous binding medium to the residue with agitation, e.g., in a conventional pelletizer or wetting drum. This material, e.g., nodular dryer residue of substantially minus one-quarter inch pellets, contains from 5 – 35 weight percent bound water and can be shipped. Preferably, this agglomerated residue is calcined in an oxidizing atmosphere at temperatures sufficient to convert substantially all the metal chlorides to their respective metal oxides. Under such conditions, the carbon and water content of the residue is substantially reduced. The calcined nodular product thereby produced can occupy about one-half the volume formerly occupied by the agglomerated residue, i.e., it is densified. It is, therefore, more economical to ship than the agglomerated residue and is more amenable to conventional methods for metal recovery, i.e., due to the substantial absence of the chloride, carbon and water content. Thus, what was previously a waste product and potential pollutant has, by the process of the present invention, been converted into a valuable feedstock for metal recovery and metal alloying.

BRIEF DESCRIPTION OF THE DRAWING

The single FIGURE is a block diagram of one method for producing and purifying titanium tetrachloride produced by chlorination of titaniferous ore, which diagram incorporates the titanium tetrachloride dryer residue nodulizing and calcining zones of the present invention.

DETAILED DESCRIPTION

Titanium tetrachloride is commonly produced commercially by chlorinating a titaniferous ore, such as ilmenite, rutile, arizonite, leucoxene and titanium slags and concentrates in the presence of carbon or a carbonaceous material, e.g., coke, at temperatures of from about 500° C. to about 1,400° C. The chlorination is typically conducted in a static bed or fluosolids reactor. Referring to the accompanying FIGURE, ore, carbon and chlorine are introduced into chlorinator 1, as shown by lines 20 and 21, respectively. In chlorinator 1, titanium and other metal values are chlorinated to their respective chlorides.

The carbonaceous reductant utilized can be any carbon-containing reducing agent that is substantially hydrogen-free since the presence of hydrogen in the chlorinator results in the formation of hydrogen chloride which both increases the consumption of chlorine and causes corrosion in the chlorinator and downstream equipment. Typically, coke or carbon monoxide are employed; however, other carboncontaining reducing agents, such as graphite, charcoal, etc., can be employed. The amount of carbonaceous reductant admixed with the titaniferous ore will vary; however, typically, the amount ranges from about ten to about 30 percent by weight, of the total composition of the feed charged to the chlorinator.

The product effluent removed from the chlorinator, as shown by line 22, typically comprises vaporous titanium tetrachloride, as well as the other metal and non-metal chloride and oxychloride components of the metal and non-metal values contained in the titaniferous ore and carbon reductant feed that are vaporizable at the chlorination temperatures used. Hereinafter, the aforesaid metal and non-metals will be referred to collectively as metals and their chlorides and oxychlorides (or any other form) as chlorides. Carbon dioxide, carbon monoxide, chloride, phosgene and entrained unreacted solids (normally ore, carbon and the oxides of silica and zirconia) are also present in the product effluent. Typical of the metal chloride components in the product effluent (other than titanium) are the chlorides of iron, silicon, tin, aluminum, vanadium, chromium, niobium (columbium), tantalum, tungsten, tin and zirconium.

The product effluent stream from chlorinator 1 is forwarded to condensation zone 3 wherein the effluent stream is cooled to below the dew point of titanium tetrachloride to produce impure titanium tetrachloride condensate. The uncondensed components of the product effluent stream, principally carbon dioxide, carbon monoxide, and trace amounts of chlorine and uncondensed metal halides are removed from the condensation zone (not shown) and forwarded to a scrubbing zone to remove noxious components therefrom. Typically, the scrubbing zone comprises a conventional water or caustic scrubber. Following scrubbing, the resulting gaseous stream, usually referred to as waste gas, is normally diluted with air and forwarded to a vent stack (not shown) whereat the combustible components thereof, i.e., principally carbon monoxide, are burned. Alternatively, the waste gas can be forwarded to a $CO/CO_2$ recovery unit.

The impure titanium tetrachloride condensate produced in condensation zone 3, in accordance with the embodiment shown in the FIGURE, is a slurry of entrained solids (ore, coke and metal oxides) and solid metal chlorides, most notably, iron chlorides, liquid metal chlorides, principally titanium tetrachloride. Normally, most of the aforementioned solid components are removed from the impure titanium tetrachloride condensate before subjecting the titanium tetrachloride condensate to further purification by chemical treatment and distillation. Separation of solid components from the liquid components of the forward flow slurry (line 23) can be accomplished readily by forwarding the slurry, as shown by line 23, to a solids separation zone 5 that can comprise settling tanks and/or heated tanks to vaporize a substantial portion of the liquid components of the condensate away from the solids contained therein. In addition, solid components in the product effluent stream (line 22) can be removed therefrom before total condensation in zone 3 by, for example, interposing a cyclone (not shown) between chlorinator 1 and condensation zone 3. Such solids can be combined with the solids from separation zone 5 in sludge storage 13 which will be discussed hereinafter or can be fed directly to nodulizing zone 17. Typically, the solids removed from separation zone 5 are removed as a 10 - 30 weight percent slurry of titanium tetrachloride.

In solids separation zone 5, substantially all of the solids in the slurry are separated. The solids or sludge, as it is often called, accummulated in the solids separation zone 5 is removed from that zone, as shown by line 32, into a sludge storage tank 13. Typically, the solids removed from separation zone 5 are removed as a slurry in titanium tetrachloride to permit passage easily of the solids through transfer lines, e.g., line 32. The precent solids in the sludge removed from separation zone 5 is usually as high as possible and can comprise from about 10 to about 30 percent, more typically from 18 to 22 percent, solids. At very high solids levels, the sludge tends to set up (gel) and become non-flowable or pumpable. The exact level at which the sludge becomes too viscous for flow varies with its chemical composition and temperature, the former of which varies with and even within the particular titaniferous ore chlorinated.

As noted above, metal chlorides other than titanium tetrachloride are present in the titanium tetrachloride condensate. One such metal chloride, i.e., the vanadium chlorides, are not separated easily from titanium tetrachloride by distillation because of the proximity of their boiling points to titanium tetrachloride. The vanadium chloride can be present in the form of vanadium tetrachloride and/or vanadium oxychloride. By way of example, impure titanium tetrachloride can comprise from about 0.1 to about 0.1 weight percent vanadium, calculated as $V_2O_5$, based on the weight of titanium tetrachloride.

It is customary to treat crude titanium tetrachloride with chemical reagents, most notably, organic purifying agents, that have an affinity for vanadium in order to tie up the vanadium as a high boiling chemical complex. Such chemical purifying agents are well known to persons skilled in the art of titanium tetrachloride manufacture. Among the purifying agents disclosed in the art there can be mentioned: sulfur, hydrogen sulfide, chlorinated hydrocarbons, metals, such as copper and powdered iron, either alone or in combination with alkaline agents, metal hydrides, and other organic treating agents, such as animal oil, e.g., talpa oil, vegetable oils, e.g., tall oil, waxes and hydrolyzed and saponified derivatives, such as fatty acids, fatty alcohols, and soaps; petroleum fractions, such as lubricating oil, mineral oil and heavy residual fractions, such as Bunker "C" oil and predominantly hydrocarbon polymers, such as polyethylene and polypropylene. Typically, from about 0.03 to about 10 percent by weight of purifying agent having affinity for vanadium, based on the amount of titanium tetrachloride treated, is used.

As shown in the drawing, titanium tetrachloride substantially free of solids is removed from solids separation zone 5, as shown by line 24, and forwarded to chemical treatment zone 7. This stream typically contains less than one weight percent solids and is referred to as crude titanium tetrachloride. Purifying agent from a source not shown is introduced into the chemical treatment zone 7, as shown by line 25, either batchwise or continuously. There, the purifying agent having affinity for vanadium is intimately mixed with the substantially solids-free crude titanium tetrachloride.

Chemical treatment 7 is normally manintained near the boiling point of titanium tetrachloride, i.e., between 270° F. and 300° F., so that the metal halide vapors, e.g., titanium tetrachloride vapors, that are distilled from the liquid surface in zone 7 are removed and forwarded to distillation zone 9, as shown by line 26. The overhead from distillation zone 9 is forwarded to condensation zone 11, as shown by line 28, from which substantially vanadium-free titanium tetrachloride is recovered, as shown by line 30. This product material can be forwarded to product storage (not shown) or, if desired, can be subjected to further distillations or rectifications for further purification. The bottoms from distillation zone 9 (and others, if used) can be forwarded to sludge storage 13, as shown by lines 29 and 27.

As titanium tetrachloride is removed from chemical treatment zone 7 (batchwise or continuously), the solids level in the liquid in the chemical treatment zone rises. The level of solids in this zone is limited to a level and/or temperature at which the contents of the zone remain flowable or pumpable, i.e., the material in the treatment zone has a tendency to congeal in the form of a pasty-type material when the solids level is too high. The exact solids level at which the contents of treatment zone 7 congeal and become non-flowable is a function of temperature, viscosity and chemical composition of the contents in the chemical treatment zone. Since the temperature is relatively constant and the chemical composition varies with the ore being chlorinated and the purifying agent used, it is customary to stay at solids levels which insure that fluctuations in the viscosity of the contents of zone 7 produced as a result of the changing chemical composition of the treatment zone, do not cause congealing accidentally. Solids levels of from about 13 to about 16 percent are typical.

When the solids level of the contents in treatment zone 7 reaches a level above which the viscosity of the contents can become too high for pumping, the treatment zone is partially purged. Typically, from one-half to four-fifths of the contents of the treatment zone is removed therefrom and the portion remaining in the treatment zone diluted with crude titanium tetrachloride from solids separation zone 5. The purged material is commonly known as purification sludge. As shown, the purification sludge from treatment zone 7 is forwarded to sludge storage 13, as shown by line 27.

In sludge storage 13, the purification sludge from treatment zone 7 is mixed with the sludge removed from solids separation zone 5, the bottoms from distillation zone 9 and another non-forward flow stream within the process which contains recoverable titanium tetrachloride and metal values. By far, the sludge from solids separation zone 5 and chemical treatment zone 7 make up most of the contents of sludge storage 13. Typically, the ratio of purification sludge to sludge from the separation zone ranges from 1:5 to 1:0.5. For purposes of brevity, the contents of sludge storage 13 will be referred to herein as "purification sludge" for the reason that it is the result of one or more types of purification steps performed on the product effluent stream removed from the chlorinator. It should be noted that, for purposes of the present invention, the purification sludge can comprise one or more or all of the streams shown as making up the contents of sludge storge 13, i.e., less than all of these streams can represent the feed to drying zone 15 and the resulting dryer residue to which the present invention is directed.

Since the liquid portion of the purification sludge is principally titanium tetrachloride, the sludge material is forwarded to drying zone 15, as shown by line 33, where the sludge is heated to substantial dryness. The metal halide vapors evolved from the sludge (principally titanium tetrachloride) are removed from the drying zone, as shown by line 34, condensed (not shown) and recycled back into the process at any convenient point. As shown, this material is recycled to the chemical treatment zone 7 via line 34.

Drying zone 15 can comprise one or more dryer means. Such dryer means can be conventional dryers (directly or indirectly heated) used for drying titanium tetrachloride sludge or any other drying means by the operation of which, vaporizable metal halides are removed from the sludge leaving a substantially dry solid residue. Drying can be accomplished in a continuous or batch manner. As examples of directly heated dryers, there can be mentioned rotary dryers, spray dryers, as shown in U.S. Pat. No. 3,009,541, pneumatic conveying dryers, through circulation dryers and compartment dryers. As examples of indirectly heated dryers, there can be mentioned screw conveyor dryers, steam tube rotary dryers and vacuum rotary dryers. Thus, as used herein, the term "dryer residue" is intended to mean and include the substantially dry solids obtained by the removal of vaporizable metal chlorides, e.g., $TiCl_4$, from the $TiCl_4$ purification sludge (as defined herein) regardless of the particular dryer means for removing said metal chlorides from said sludge.

The dried solids comprising the dryer residue have to date been considered as a waste product and, thus, have been disposed of in a manner in which solid wastes from a commerical process are handled, i.e., dumped into a waste pond or waste dump area. Because the vanadium and chromium values contained in the dryer residue are leachable with water, the dryer residue is often treated to insolubilize these metals before or during disposal to prevent their being leached and the disposal area continually monitored to prevent resolubilization.

Titanium tetrachloride dryer residue from the chlorination of rutile ore is greyish black and free flowing. It is typically powdery with occasional lumps. It evolves brown and white fumes when exposed to the air when hot, e.g., upon discharge from the dryers. Such fumes are believed to be comprised of residual titanium tetrachloride, iron chlorides and hydrogen chloride remaining in the residue. Sometimes, the residue spontaneously bursts into flame (pyrophoric) upon exposure to air after discharge from the dryers. The residue is very dusty, corrosive and difficult to handle in conventional equipment because of its dusty character. Because of its dusty and corrosive character, it represents a potential health hazard to those persons who have to handle it upon its discharge from the drying zone. A typical chemical analysis of dryer residue obtained from the production of $TiCl_4$ by chlorination of rutile ore is tabulated in Table I. The metals listed in Table I are present predominantly as their chlorides and oxychlorides.

TABLE I

TiCl₄ Dryer Residue

| Chemical | Analysis (wt. %) |
| --- | --- |
| Cl⁻ | 40.3 |
| SiO₂ | 11.0 |
| Fe | 5.7 |
| C | 4.9 |
| Zr | 4.7 |
| Al | 0.3 |
| Cr | 1.3 |
| Nb | 3.2 |
| V | 3.6 |
| Ti | 2.8 |
| Mg | 1.8 |
| Ca | 1.1 |
| W | 0.5 |
| Mn | 0.7 |
| Undetermined | Remainder |

In accordance with the present invention, the dryer residue from drying zone 15 is forwarded to nodulizing zone 17, as shown by line 35. Preferably, the dried residue is not exposed to the air during transfer, thereby avoiding the aforementioned health hazard. There, the dryer residue is contacted with a liquid binding medium, preferably an aqueous binding medium, with stirring to agglomerate the powdery residue and form essentially rounded (nodular) shapes. The resulting dryer residue granules or pellets preferably range from about one sixty-fourths – one-half inch in average diameter although smaller or larger granules can be produced. The size of the granules is not critical and depends on the equipment used and the amount of control exercised during the nodulizing step. Most preferably, the granules are kept below one-half inch, e.g., from one thirty-seconds - one-fourths inch in average diameter in order to calcine the granules economically. Thus, granules larger than one-half inch take longer to dry and calcine than smaller granules. Further, short calcination times prevent sintering of already dried smaller granules.

The binding medium used can be any liquid, such as water, organic and inorganic solvents, oils, etc., that is compatible with the dryer residue, enhances the surface adhesion of the residue and causes it to gather into samll, substantially ball-like particles, preferably of the approximate size recited hereinabove, during stirring. While any suitable liquid binding medium can be used, such binding mediums being known in the art of agglomerating finely-divided solids, for economical purposes, an aqueous binding medium is most suitable and is preferred. The aqueous binding medium can be water of any type, e.g., plant water, tap water, river water, deionized water, etc. Further, such water can have an alkaline or acidic character by the addition of an alkaline or acidic reagent to the water binder. Both have been found to be acceptable. An acidic aqueous binding medium will reduce hydrolysis of the metal chlorides in the residue and thereby moderate the fuming resulting from the contact of the residue with water. Aqueous solutions of mineral acids, such as hydrochloric acid, nitric acid, sulfuric acid, etc., are economically preferred if an acidic solution is used. Aqueous solutions or slurries of alkaline reagents, such as the oxides, hydroxides, carbonates and bicarbonates of the alkali and alkaline earth metals and ammonia can also be used. Specific examples thereof include: sodium hydroxide, potassium hydroxide, a lime slurry, barium hydroxide, magnesium hydroxide, magnesium carbonate and sodium carbonate and bicarbonate. An aqueous solution of an alkaline reagent will also neutralize a portion of the chloride content of the residue and is, therefore, desirable. However, if residual metal chloride salts, such as sodium chloride, are not desirable in the residue because of a particular end use thereof, e.g., metal alloying, alkaline reagents producing such salts should be avoided. Thus, the end use of the nodular residue may prescribe the particular liquid binding medium used.

The liquid binding medium can be added to the dryer residue in any convenient manner, e.g., slow addition with stirring, spraying, etc. Suprisingly, it has been found that nodulizing of the dryer residue is readily accomplished by simply stirring the residue in the presence of the binding medium. No special techniques are required since the residue is gathered easily into granules of more or less spherical form by this method.

Only that amount of binding medium that is sufficient to agglomerate the dryer residue into the ball-like shapes described above and remain bound in such form is used. Such amount will vary with the particular residue and, therefore, can be characterized as a pelletizing, nodulizing, granulating, agglomerating or moistening amount of binding medium. Typically, the amount of binding medium used will vary from about 5 to about 35 percent, based on the dryer residue, more typically from about 15 – 30 weight percent. It should be observed that excess amounts (over the above-recited range) of binder agent are not preferred for the reason that the residue can become mud-like in character. Mud-like residues are more difficult to handle; and, the handling and drying of such a material is economically wasteful for the reasons that the following step, i.e., a calcination step, removes the excess binder present in the pelletized residue, more heat is required in the calcination step thereby increasing fuel costs, and stronger equipment is required to handle the heavier material. Further, if the nodulized residue is sold as an article of commerce, the excess binding medium would increase shipping costs.

Nodulizing of the dryer residue can be accomplished in any conventional mixing equipment constructed of materials resistant to the typical acid character of the dryer residue. Mixers of the stirring or agitating type, e.g., cement mixers, rolls or roller mills, ball mills, wetting drums, granulators, cone pelletizers or tumbling barrels, or any of the aforementioned in combination with a pellet mill or pelletizer can be used.

The benefits obtained by nodulization are numerous. The nodulized material is more convenient to store, ship or handle than the dry, powdery residue produced by the dryers. Nodulization reduces dust losses during handling, shipment or furnacing (as in the next step) and also removes the health hazard resulting from being exposed to dust of the nature of titanium tetrachloride dryer residue. The nodulized material does not cake or lump into large solids masses but remains permanently bound as marble-like particles, i.e., it retains its geometry.

During nodulizing of the dryer residue, some fumes may be evolved from the dryer residue. This condition may be especially prevalent if the nodulizing is performed while the dryer residue is still hot, e.g., upon discharge from the dryers. In a continuous system, such as herein contemplated, such hot treatment would take place. Thus, the nodulizing zone should be equipped with gas removal means, e.g., gas conduits, which are connected to a scrubbing and vent system (not shown) to neutralize and dispose of the noxious components evolved during nodulizing of the dryer residue. The aforesaid scrubbing system can be any conventional water or caustic scrubber connected to a vent or stack. The aforementioned scrubber and stack can be that provided for the calcination zone described hereinafter.

The pelletized or nodular titanium tetrachloride residue formed in nodulizing zone 17 is removed therefrom and, if desired, can be stored or shipped, i.e., it can be the feedstock for a metal recovery or metal alloying process. Preferably, it is forwarded to calcination zone 19, as shown by line 36. There, the nodular dryer residue is fed into a furnace maintained at temperatures sufficient to convert metal chloride values in the residue to their respective metal oxides. preferably, substantially all of the metal chloride values are converted to metal oxides. Simultaneously, the carbon present in the residue is oxidized to carbn monoxide or carbon dioxide and thereby removed from the residue. In addition, a significant portion of the chloride content ($Cl^-$) of the residue, i.e., chemically combined chlorine, is also removed. The oxidizing conditions of the furnace can be furnished by either air or air supplemented by commerically available oxygen.

Any conventional type of furnace capble of generating the temperatures required to convert the metal chlorides to their respective metal oxides can be used to calcine the nodular titanium tetrachloride dryer residue. Examples thereof include direct and indirect heated rotary kilns, hearth and multiple hearth furnaces, flat grate furnaces and fluidized beds. The temperatures of calcination will typically be greater than 1,000° F., e.g., from 1,200° F. to 2,000° F., more typically from 1400° F. to 1,800° F.

The residence time of the nodular titanium tetrachloride residue in the furnace should be regulated to achieve a calcined nodular titanium tetrachloride dryer residue product having its metal values substantially present as oxides. It is preferred that the product also be substantially free, i.e., less than 0.5 weight percent, of chloride ion and carbon. Residence times will depend to a great extent on the temperature at which the calcination is performed. Thus, the higher the calcination temperature, the lower the residence time required. Generally, calcination temperatures of from 1400° – 1800° F., with average residence times of from about five minutes to three hours are sufficient. Neither the calcination temperature nor the residence time are particularly critical in the practice of the present invention, so long as the result to be accomplished is performed, i.e., the conversion of metal chlorides to metal oxides. Preferably, sintering of the granules is avoided in order to obviate subsequent handling and shipping difficulties that may ensue. As mentioned above, the furnace is connected to a scrubber and vent stack to detoxify and dispose of (usually by burning) the gases evolved during calcination, i.e., water, HCl, carbon monoxide, carbon dioxide, etc.

The calcined granular titanium tetrachloride dryer residue removed from calcination zone 19, as shown by line 37, is granular in character but with an average particle size smaller than that of the nodular feed to the calcining zone. In addition, the calcined particles are harder than the nodular feed and are grey to black and sometimes dark rusty brown in color. Generally, the longer the retention time in the calciner, the smaller the particle and the darker in color the product. The calcined granular titanium tetrachloride dryer residue having its metal values present substantially as oxides will have, for example, a median particle size of from about 0.02 to about 0.08 inch, more typically from about 0.03 to about 0.06 inch. The bulk density of the calcined product may be higher or lower than the nodular feed to the furnace, depending on the severity of calcination. Light calcination conditions will generally produce a product with a bulk density lower than the nodular feed. In contrast, heavy calcination conditions will produce a product with a higher bulk density than the nodular feed due to the shrinking of the individual particles. The higher bulk density product typically occupies approximately one-half the volume previously occupied by the nodular feed. Bulk densities of the nodular feed and calcined product will, of course, depend on the particular chemical composition of the dryer residue. Average bulk densities vary, for example, from 35 to 80 lbs./ft.$^3$.

The calcined nodular titanium tetrachloride dryer residue also can be easily handled and shipped. Metals, such as vanadium, niobium, chromium and tungsten, can be recovered from this material and, thus, instead of a typical waste stream, the product represents an article of commerce, i.e., a source of the metals contained therein. For example, this material can be used as a source of the valuable metals contained therein, e.g., vanadium; it can be used as received for metal alloying; and it can be chlorinated to produce the chlorides of the metals present therein.

The present process is more particularly described in the following examples which are intended as illustrative only since numerous modifications and variations therein will be apparent to one skilled in the art.

EXAMPLE I

Rutile ore mixed with about 20 weight percent coke was chlorinated with gaseous chloride in a fluid bed chlorinator and the product effluent cooled to a temperature below the dew point temperature of $TiCl_4$ to produce an impure titanium tetrachloride condensate. After separation of a substantial portion of the solids (as a slurry of solids) present in the condensate in a solids separation zone, the resulting substantially solids-free crude titanium tetrachloride was forwarded to a chemical treatment zone where it was contacted with about 0.1 weight percent talpa oil to tie up the vanadium content contained in the crude titanium tetrachloride as a high-boiling complex. Titanium tetrachloride was distilled from the chemical treatment zone leaving therein a slurry of purification sludge. The purification sludge slurry formed in the chemical treatment zone and the slurry of solids from the solids separation zone were combined in a common purification sludge storage tank. The resulting mixture of material (referred to herein for purposes of brevity as purification sludge) was then heated to dryness to produce a powdery, dusty greyish black titanium tetrachloride dryer residue and $TiCl_4$ vapor, which was condensed and recycled back into the process. One hundred (100) grams of the dryer residue were placed in a glass beaker and 30 milliliters of a ten weight percent aqueous solution of concentrated hydrochloric acid added slowly with stirring. The powdery residue gathered into dust-free, ball-like particles of from about one-eighths inch to about one-fourths inch in approximate diameter easily.

The above procedure is repeated with both plain tap water and about a ten weight percent sodium hydroxide aqueous solution. The results obtained are similar, i.e., nodulizing or pelletizing of the dryer residue to dust-free agglomerates is accomplished easily.

EXAMPLE II

About 350 pounds of titanium tetrachloride dryer residue produced in a manner similar to Example I was nodulized using tap water as the binding medium. A portion of the nodular material was introduced into a rotary calciner, wherein the average inlet temperature was maintained at about from 1,630° – 1,646° F. Retention time (calculated) in the calciner was about 25 minutes. The procedure was repeated with two other portions of the dryer residue except that the retention time was lengthened to 47 and 137 minutes respectively. The atmosphere in the calciner was oxidizing, which was provided by ambient air. A partial chemical analysis of the nodular feed to the calciner and of the calcined products are listed in Table II. A screen analysis of the nodular feed and calcined products and bulk densities are listed in Table III. The calcined product can be used directly as a constituent of metal alloys, the composition of which utilizes one or more of the principal elements found in the calcined product (Table III) or can be used as a raw material source for such elements as vanadium.

TABLE II

Chemical Analysis of TiCl₄ Dryer Residue

| Sample | Feed Material | Calcined Product | | |
|---|---|---|---|---|
| | | Part 1 | Part 2 | Part 3 |
| Kiln Temp. (°F.) | — | 1630 | 1646 | 1646 |
| Kiln Retention (Min.) | — | 24 | 47 | 137 |
| Component Analysis (Wt. %) | | (a) | | |
| C | 9.5 | 6.4 | 4.5 | 0.1 |
| ZrO₂ | 10.6 | — | 20.2 | 20.5 |
| V₂O₅ | 7.0 | — | 14.4 | 14.8 |
| SiO₂* | 6.9 | — | 13.6 | 14.3 |
| Nb₂O₅ | 6.9 | — | 12.8 | 14.0 |
| Al₂O₃* | 4.1 | — | 9.2 | 9.3 |
| TiO₂ | 4.5 | — | 8.5 | 9.2 |
| Fe₂O₃ | 3.8 | — | 7.0 | 7.6 |
| Cr₂O₃ | 1.5 | — | 3.2 | 3.2 |
| Ta₂O₅ | nil | — | nil | nil |
| Moisture | 33.2 | — | 0.4 | 0.2 |
| Cl⁻ | 28.0 | — | 0.1 | 0.1 |
| Total | 116.0 | — | 93.8 | 93.1 |
| Loss on Ignition | 53.8 | 6.8 | 4.5 | 0.3 |

(a) Determined C% and Loss on Ignition only.
* Approximate values.

TABLE III

Screen Analysis of TiCl₄ Dryer Residue

| Screen Size U.S. Standard Mesh | Feed Material Wt. % On | Calcined Product | | |
|---|---|---|---|---|
| | | Part 1 Wt. % On | Part 2 Wt. % On | Part 3 Wt. % On |
| 5/16 Inch | 4.2 | — | — | — |
| 4 | 30.3 | 13.1 | — | — |
| 6 | 21.8 | 15.7 | 11.4 | — |
| 10 | 32.0 | 19.3 | 21.0 | 5.4 |
| 16 | — | 13.0 | 15.4 | 23.0 |
| 20 | 10.3 | 7.4 | 8.2 | 19.8 |
| 30 | — | 12.3 | 12.9 | 22.2 |
| 40 | — | 8.4 | 14.8 | 17.6 |
| 50 | — | — | — | 5.6 |
| Pan | 1.4 | 10.8 | 16.3 | 6.4 |
| Total | 100.0 | 100.0 | 100.0 | 100.0 |
| Median Particle Size (Inches) | 0.14 | 0.062 | 0.043 | 0.032 |
| Bulk Density (lb./ft.³) | 55.3 | (a) | 53.5 | 72.8 |

(a) Not determined.

Examples I and II show that titanium tetrachloride dryer residue can be nodulized easily and the resulting nodular material calcined to produce a product from which metal values, such as vanadium, can be recovered.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

We claim:

1. Calcined nodular titanium tetrachloride dryer residue comprising metal values including titanium, iron, vanadium and chromium, said metal values being present substantially as metal oxides, said residue having been obtained from purifying titanium tetrachloride produced from titanium-bearing material containing such metal values, and said nodular residue having been calcined at temperatures in excess of 1000°F.

2. The product of claim 1 wherein the calcined, nodular TiCl₄ dryer residue has a bulk density of from 35 – 80 lbs./ft.³.

3. The product of claim 1 wherein the calcined, nodular TiCl₄ dryer residue has a median particle size of from about 0.03 – 0.08 inch.

4. The product of claim 1 wherein the calcined, nodular $TiCl_4$ dryer residue is substantially free of carbon and chemically combined chlorine.

5. A process for treating titanium tetrachloride dryer residue obtained from purifying titanium tetrachloride produced from titanium-bearing material containing metal values other than titanium, which comprises agitating said residue with a nodulizing amount of an aqueous binding medium to produce a substantially dust-free nodular product, the particles of which range in size from about one sixty-fourths – one-half inch, calcining in an oxidizing atmosphere said nodular product at temperatures above 1000°F. and for from about 5 minutes to about 3 hours and recovering calcined, nodular titanium tetrachloride dryer residue which is substantially free of carbon and chemically combined chlorine and which has its metal content value present substantially as metal oxides.

6. A process for treating titanium tetrachloride dryer residue obtained from purifying titanium tetrachloride produced from titanium-bearing material containing metal values other than titanium, which comprises nodulizing said residue with a nodulizing amount of a liquid binding medium to produce a nodular product, and heating said nodular product in an oxidizing atmosphere at temperatures and for a time sufficient to convert substantially all the metal values therein to their respective oxides.

7. A process for treating dry solids obtained by drying sludge produced from chemical purification of titanium tetrachloride produced from titanium-bearing material containing metal values other than titanium, which comprises nodulizing said solids with a nodulizing amount of a liquid binding medium to produce a nodular product, and heating said nodular product at temperatures greater than 1000°F. for from about 5 minutes to about 3 hours to convert substantially all the metal values therein to their respective oxides.

8. The process of claim 6 wherein the titanium-bearing material contains vanadium.

9. The process of claim 7 wherein the titanium-bearing material contains vanadium.

10. A process according to claim 6 wherein said nodular product is heated at temperatures greater than 1000° F.

11. A process according to claim 10 wherein said nodular product is heated at temperatures of from 1400° - 1800° F. for from about 5 minutes to about 3 hours.

12. The process of claim 7 wherein the liquid binding medium is an aqueous binding medium.

13. The process of claim 7 wherein the nodular product is not greater than one-half inch in average diameter.

14. The process of claim 7 wherein the temperature is from 1400° F. to 1800° F.

15. The process of claim 7 wherein the heated nodular product is substantially free of chemically combined chlorine and carbon.

* * * * *